(12) United States Patent
Mason

(10) Patent No.: US 9,671,063 B2
(45) Date of Patent: Jun. 6, 2017

(54) HEADER SUPPORT SYSTEM

(71) Applicant: NEW DIMENSIONS RESEARCH CORPORATION, Melville, NY (US)

(72) Inventor: Timothy L. Mason, Melville, NY (US)

(73) Assignee: New Dimensions Research Corporation, Melville, NY (US)

( * ) Notice: Subject to any disclaimer, the term of this patent is extended or adjusted under 35 U.S.C. 154(b) by 0 days.

(21) Appl. No.: 14/267,110

(22) Filed: May 1, 2014

(65) Prior Publication Data

US 2015/0313378 A1    Nov. 5, 2015

(51) Int. Cl.
| | |
|---|---|
| *A47F 5/08* | (2006.01) |
| *F16M 13/02* | (2006.01) |
| *F16M 11/04* | (2006.01) |
| *F16B 1/00* | (2006.01) |
| *A47F 5/00* | (2006.01) |

(52) U.S. Cl.
CPC ......... *F16M 13/022* (2013.01); *A47F 5/0823* (2013.01); *A47F 5/0846* (2013.01); *F16M 11/048* (2013.01); *A47F 2005/0075* (2013.01); *F16B 2001/0028* (2013.01); *F16M 2200/028* (2013.01)

(58) Field of Classification Search
CPC .... A47F 5/0884; A47F 5/0823; A47F 5/0869; A47F 5/0807; A47F 5/0817; A47F 5/0068; A47F 2005/0075; A47F 5/0846; F16M 13/022; F16M 11/048; F16M 2209/028; F16B 2001/0028

USPC ... 248/288.11, 282.1, 283.1, 220.42, 220.41, 248/220.43, 220.21, 220.22, 220.31, 248/221.12, 223.31, 223.41, 224.7, 224.8, 248/224.41, 225.21; 211/87.1, 87.01, 211/57.1, 104, 106, 54.1, 7, 59.1, 113; 40/606.14, 607.13

See application file for complete search history.

(56) References Cited

U.S. PATENT DOCUMENTS

| | | | | |
|---|---|---|---|---|
| 2,952,343 | A | * | 9/1960 | Modrey ................. 403/376 |
| 3,484,069 | A | * | 12/1969 | Larson ................. 248/220.42 |
| 3,494,585 | A | * | 2/1970 | Larson ................. 248/220.42 |
| 3,677,415 | A | * | 7/1972 | Radek ................. 248/220.42 |
| 3,939,985 | A | * | 2/1976 | Hochman ........... 248/220.22 |
| 4,140,294 | A | * | 2/1979 | Zwarts ................. 248/265 |
| 4,179,091 | A | * | 12/1979 | Bidney ................. 248/265 |
| 4,549,712 | A | * | 10/1985 | Simon et al. ........ 248/224.8 |
| 5,088,606 | A | * | 2/1992 | Boas ..................... 211/57.1 |
| 5,303,830 | A | * | 4/1994 | Metcalf ................. 211/57.1 |
| 5,657,884 | A | * | 8/1997 | Zilincar, III .......... 211/86.01 |

(Continued)

*Primary Examiner* — Nkeisha Smith
(74) *Attorney, Agent, or Firm* — Collard & Roe, P.C.

(57) ABSTRACT

A header support system for supporting a product display header on a pegboard panel includes a pegboard bracket, a support arm, an extension arm and a front plate. The pegboard bracket includes a backplate member having an upper portion, a lower portion and a front face, a spacer member, a plurality of spaced apart upper prongs for engaging the pegboard panel, a plurality of spaced apart lower prongs for engaging the pegboard panel and a plurality of first connection elements. The support arm includes substantially perpendicular first and second elongated members with connection elements for securing the support arm to the pegboard bracket. The extension arm slidably engages the second elongated member and the front plate is disposed at a proximate end of the extension arm for receiving the product display header.

11 Claims, 6 Drawing Sheets

(56) References Cited

U.S. PATENT DOCUMENTS

| | | | | |
|---|---|---|---|---|
| 5,660,286 | A | * | 8/1997 | Shea .......................... 211/87.01 |
| 5,678,794 | A | * | 10/1997 | Kump ................... A47F 5/0869 |
| | | | | 211/59.1 |
| 6,003,685 | A | * | 12/1999 | Malin ............................... 211/7 |
| 6,015,124 | A | * | 1/2000 | Loy .......................... 248/220.31 |
| 6,199,706 | B1 | * | 3/2001 | Shea .......................... 211/87.01 |
| 6,202,866 | B1 | * | 3/2001 | Shea .......................... 211/87.01 |
| 6,334,540 | B1 | * | 1/2002 | Plutsky .......................... 211/43 |
| 6,622,979 | B2 | * | 9/2003 | Valiulis .................... 248/220.42 |
| 6,698,124 | B2 | * | 3/2004 | Kump et al. ............... 40/642.02 |
| 6,786,340 | B2 | * | 9/2004 | Ford et al. .................. 211/59.1 |
| 7,441,736 | B2 | * | 10/2008 | Wiltfang ................. 248/220.42 |
| D590,448 | S | * | 4/2009 | Dukes et al. .................. D20/42 |
| 7,891,617 | B2 | * | 2/2011 | Tisbo ....................... 248/220.22 |
| 8,291,630 | B2 | * | 10/2012 | Schwartz .................. 40/611.07 |
| 8,919,264 | B1 | * | 12/2014 | Lager ........................... 108/147 |
| 2002/0066840 | A1 | * | 6/2002 | Servant .................... 248/220.22 |
| 2010/0051769 | A1 | * | 3/2010 | Tyson ...................... 248/220.31 |
| 2014/0263896 | A1 | * | 9/2014 | David et al. .................. 248/207 |
| 2015/0089851 | A1 | * | 4/2015 | Minguez ......................... 40/594 |

\* cited by examiner

HEADER SUPPORT SYSTEM

BACKGROUND OF THE INVENTION

1. Field of the Invention

The present invention relates to header support systems for supporting a product display header on a pegboard panel. More particularly, the invention relates to a header support system including a pegboard bracket, a support arm, a slidable extension arm and a front plate for receiving the product display header.

2. The Prior Art

It is known in the field of merchandising to display products on shelves supported on freestanding fixtures known as gondolas. The gondolas typically include notched vertical frame members to which shelf support brackets may be attached and a pegboard panel extending between the frame members to which various hooks, brackets and the like may be fitted.

It is further known in the field of merchandising to support a product display header on a pegboard panel of a gondola in an area proximate a particular product or group of products in order to display advertising or other information related to the product and otherwise promote the product and highlight its location on the gondola.

Existing means for supporting product display headers on pegboard panels have a number of drawbacks and deficiencies. In particular, straight support brackets which extend horizontally out from a pegboard panel limit the height at which products can be displayed on the gondola because the height at which such brackets can support the display header is limited by the top of the pegboard panel. Additionally, known header support brackets lay flush against the pegboard panel. As a result, the height at which such known brackets can be secured to the pegboard panel is limited by a cap element which runs horizontally across the top portion of the gondola and in some cases extends forwardly out over the pegboard panel.

Moreover, in order to secure a support bracket to a pegboard, it is generally necessary to manipulate the upper prongs of the support bracket into the pegboard openings by rotating the top of the support bracket toward the pegboard surface and the bottom of the support bracket away from the pegboard surface. This installation procedure is difficult to accomplish with known support brackets for product display headers which have elongated arms extending outwardly from the bracket. In particular, the elongated structure of the known header support brackets can interfere with the gondola shelves or other structure when attempting to rotate the bracket into position for securing it to the pegboard, thereby making installation of the support bracket difficult or impossible and otherwise limiting the placement of the header support brackets.

Accordingly, there exists a need for a header support system for supporting a product display header which can be easily secured to a pegboard panel in various placement positions. There further exist a need for such a header support system which can be can be mounted to an upper portion of a pegboard panel of a gondola having a cap element running horizontally across the top portion of the gondola and extending forwardly out over the pegboard panel. There further exists a need for such a header support system which can support a product display header at a height above the top of the pegboard panel, thereby allowing product display headers to be used in combination with products positioned on the upper shelves of a gondola and extending at greater heights than possible with known header support means, including products extending over the height of the gondola. There further exists a need for a header support system having horizontally adjustable support arms for accommodating shelves of various depths.

SUMMARY OF THE INVENTION

A header support system for supporting a product display header on a pegboard panel is provided. The header support system includes a pegboard bracket, a support arm, an extension arm and a front plate.

The pegboard bracket includes a backplate member having an upper portion, a lower portion and a front face. The pegboard bracket further includes a spacer member, at least a portion of which extends rearwardly from the upper portion of the backplate member. The pegboard bracket also includes a plurality of spaced apart upper prongs disposed on the spacer member and configured for engaging the pegboard panel and a plurality of spaced apart lower prongs disposed on the lower portion of the backplate member and configured for engaging the pegboard panel. The pegboard bracket also includes a plurality of first connection elements disposed at the front face of the backplate member.

The support arm includes a first elongated member extending in a first direction and having a plurality of second connection elements. Each of the plurality of second connection elements is configured to engage an associated first connection element of the plurality of first connection elements for securing the support arm to the pegboard bracket. The support arm further includes a second elongated member extending in a second direction substantially perpendicular to the first direction.

The extension arm slidably engages the second elongated member of the support arm. The front plate is disposed at a proximate end of the extension arm for receiving the product display header.

In another aspect, the plurality of first connection elements includes a plurality of projections projecting outwardly from the front face of the backplate member and the plurality of second connection elements includes a plurality of openings.

In another aspect, the plurality of projections includes a plurality of rivet bosses and the plurality of openings includes a plurality of keyhole openings.

In another aspect, the plurality of projections includes a plurality of lance tabs and the plurality of openings includes a plurality of slots.

In another aspect, the front plate includes a fastening element disposed thereon. The fastening element may include a hook and loop type fastening material, or an adhesive material, for example, a foam tape pad.

In another aspect, the second elongated member and extension arm include substantially tubular members. In another aspect the extension arm is received within the second elongated member.

In another aspect, the header support system further includes a spring detent. The spring detent may include an outwardly biased spring element having a detent protrusion. The outwardly biased spring element may be disposed within the extension arm and the detent protrusion may protrude through a detent opening provided at a distal end of the extension arm.

In another aspect, the second elongated member includes a plurality of spaced apart adjustment openings for receiving the detent protrusion and securing the extension arm at a selected depth.

An advantage of a header support system according to an aspect of the invention is that a header support system is provided which can be easily secured to a pegboard panel in various placement positions. A further advantage of a header support system according to an aspect of the invention is that the system can be can be mounted to an upper portion of a pegboard panel of a gondola having a cap element running horizontally across the top portion of the gondola and extending forwardly out over the pegboard panel.

A further advantage of a header support system according to an aspect of the invention is that the system can support a product display header at a height above a top of the pegboard panel, thereby allowing product display headers to be used in combination with products positioned on the upper shelves of a gondola and extending at greater heights than was possible with known header support means, including products extending over the height of the gondola.

A further advantage of the header support system according to an aspect of the invention is that a horizontally adjustable support arm is provided for accommodating shelves of various depths.

BRIEF DESCRIPTION OF THE DRAWINGS

Other benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE DRAWINGS

Figure 1:
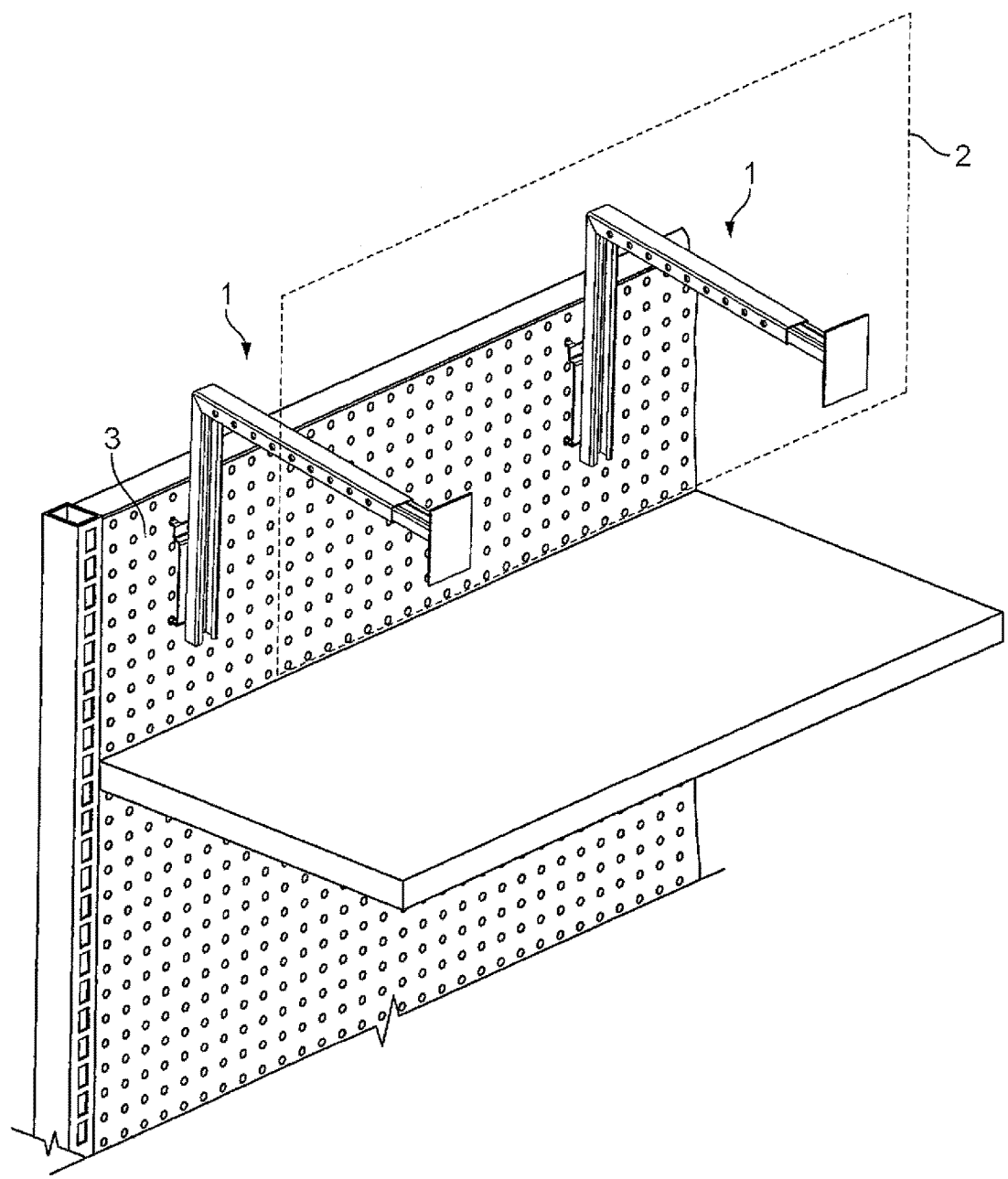
FIG. 1 shows a perspective view of a header support system supporting a product display header according to an embodiment of the invention.

Turning now to the drawings, FIG. 1 shows a perspective view of a header support system 1 supporting a product display header 2 on a pegboard panel 3 according to an embodiment of the invention.

The header support system 1 may include multiple units 1. For example, as shown in FIG. 1, a pair of spaced apart header support systems 1 may be employed to support a single product display header 2.

FIG. 1 shows a portion of a freestanding gondola including notched vertical frame members for supporting shelf support brackets and a pegboard panel 3 extending between frame members. A product display header 2 is supported on the pegboard panel 3 of the gondola in an area proximate to a particular product or group of products in order to display advertising or other information related to the product and otherwise promote the product and highlight its location on the gondola.

The product display header 2 may be made from paper, cardboard, plastic or any other suitable material and may have a picture frame or cutout shape such that the product display header frames or encloses an associated group of products displayed on the gondola to which the product display header is attached.

Figure 2:
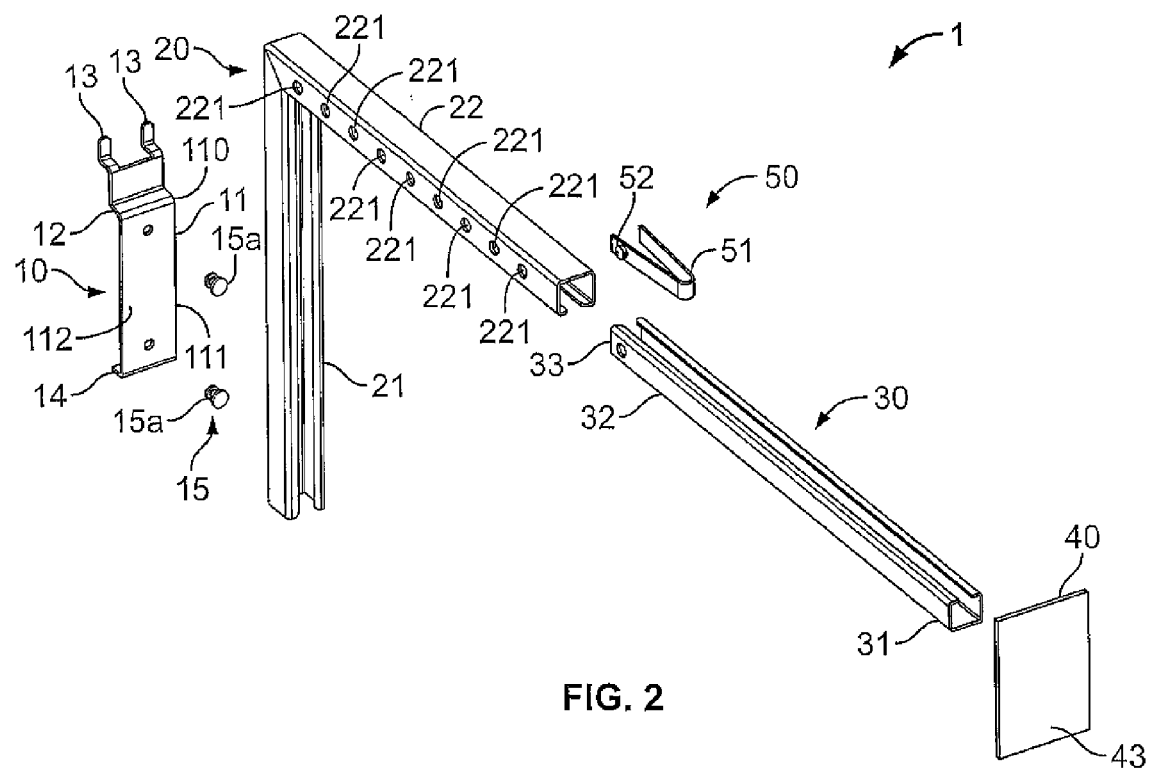
FIG. 2 shows an exploded perspective view of the header support system shown in FIG. 1.
Figure 3:
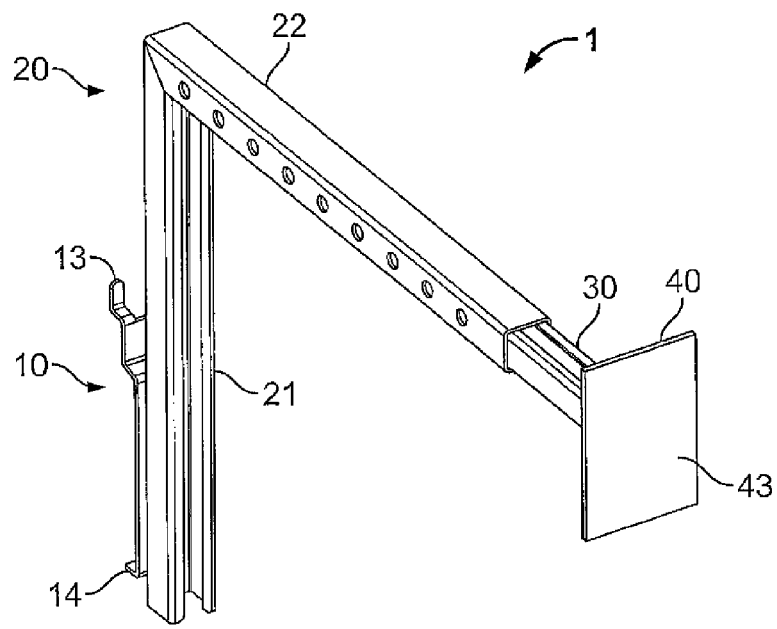
FIG. 3 shows a perspective view of the header support system in an assembled state.
Figure 4:
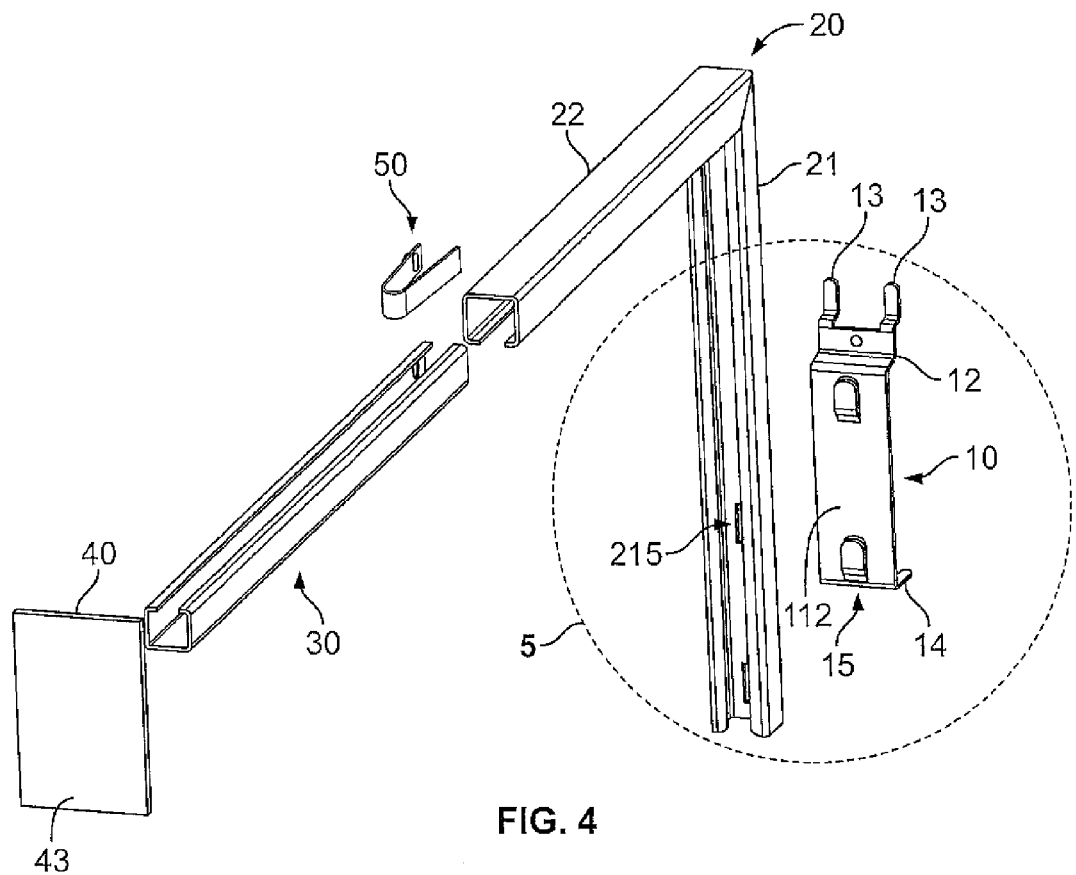
FIG. 4 shows an exploded perspective view of a header support system according to another embodiment of the invention.

As shown, for example in FIGS. 2 and 3, the header support system 1 includes a pegboard bracket 10, a support arm 20, an extension arm 30 and a front plate 40. Each of the pegboard bracket 10, support arm 20, extension arm 30 and front plate 40 may be formed from any suitable rigid material, such as for example steel, aluminum or plastic. For example, pegboard bracket 10, support arm 20, extension arm 30 and front plate 40 may be formed from cold rolled steel of a suitable gauge, such as 14-18 gauge cold rolled steel and may be powder-coated.

Pegboard bracket 10 includes a backplate member 11 having an upper portion 110, a lower portion 111 and a front face 112. Pegboard bracket 10 further includes a spacer member 12, at least a portion of which extends rearwardly from the upper portion 110 of backplate member 11. Spacer member 12 may extend perpendicularly or at an angle relative to front face 112 of backplate member 11 and functions to space front face 112 of the pegboard bracket 10 away from pegboard panel 3. In this way, the pegboard bracket 10 allows a vertical member 21 of a support arm 20 secured to front face 112 of the pegboard bracket 10 to clear the top of a gondola to which the header support system is attached. For example, the dimensions and arrangement of pegboard bracket 10, including spacer member 12, may provide for between approximately 0.25 inches and 0.50 inches, and particularly approximately 0.435 inches, of clearance between vertical member 21 of support member 20 and the pegboard panel 3. The feature allows vertical member 21 to clear a cap at the top of the gondola and permits the header support system 1 to be positioned at an upper portion of the pegboard panel 3, such that the support arm 20 can extend over the top of the gondola. For example, with header support system 1, a product display header may be supported at a height of approximately six inches higher than known header support means.

Pegboard bracket 10 may include any suitable dimensions and material. For example pegboard bracket 10 may measure approximately 5.75 inches high and 1.2 inches wide and be formed from 14 gauge cold rolled steel.

As further shown, for example in FIG. 2, pegboard bracket 10 also includes a plurality, for example a pair, of spaced apart upper prongs 13. Upper prongs 13 are disposed on spacer member 12 and are configured for engaging pegboard panel 3. Pegboard bracket 10 also includes a plurality, for example a pair, of spaced apart lower prongs 14. Lower prongs 14 are disposed on the lower portion 111 of the backplate member 11 and are configured for engaging pegboard panel 3. Upper 13 or lower 14 prongs may be substantially L-shaped for engaging corresponding spaced apart openings in pegboard panel 3.

Figure 8:
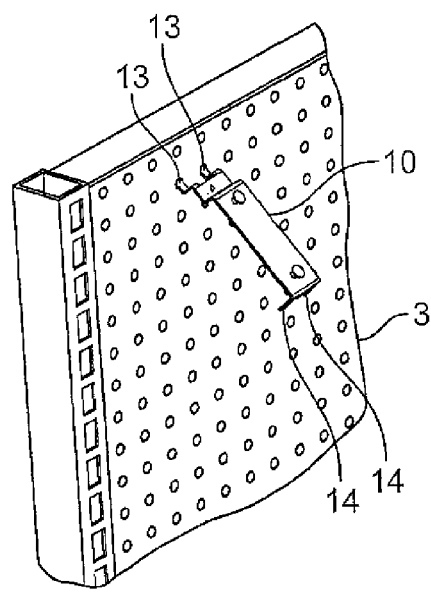
FIG. 8 shows a pegboard bracket according to an embodiment of the invention being secured to a gondola pegboard panel.
Figure 9:
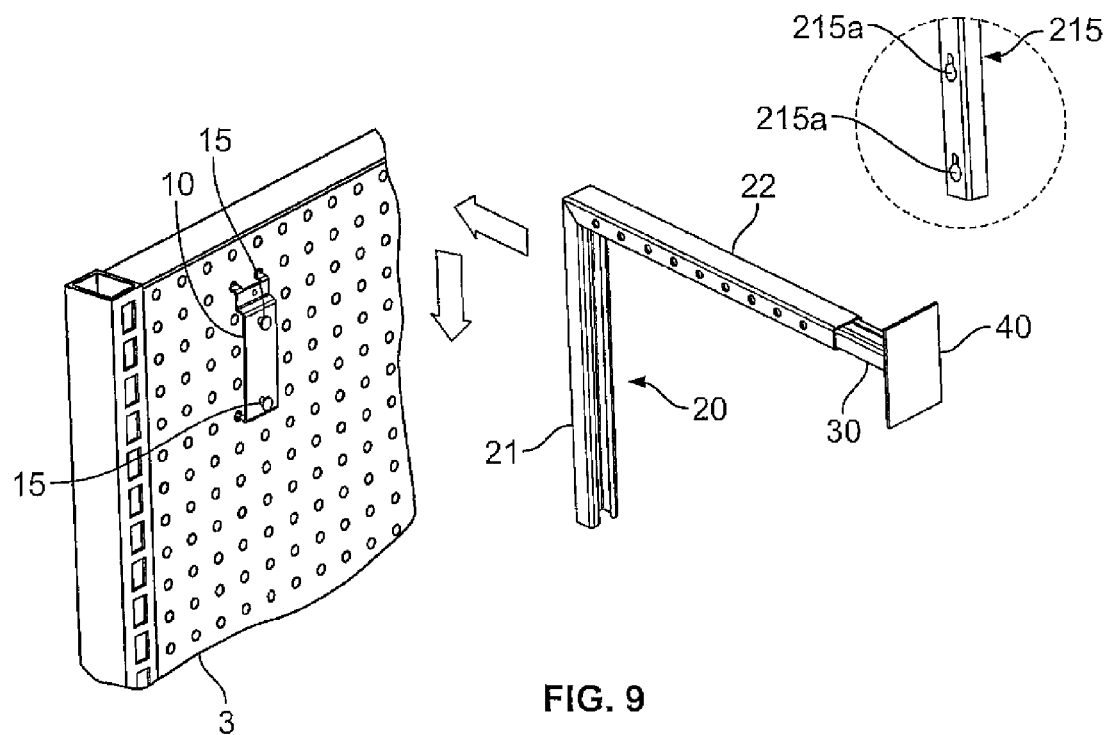
FIG. 9 shows an assembled support arm and extension arm according to an embodiment of the invention being secured to a pegboard bracket according to an embodiment of the invention.

During installation of the header support system 1, a user generally first secures pegboard bracket 10 to pegboard 3 by manipulating pegboard bracket 10 at an angle to engage the upper prongs 13 with the pegboard panel 3, as shown for example in FIG. 8, and then rotating the pegboard bracket 10 into the pegboard panel 3 to engage the lower prongs 14 with the pegboard panel 3, as shown for example in FIG. 9, thereby preventing sideways rotation of the pegboard bracket 10. As shown, for example in FIG. 9, support arm 20 or a support arm assembly is subsequently coupled to the installed pegboard bracket 10. By providing this arrangement of a multi-component assembly, the installation of the pegboard bracket 10 to the pegboard panel 3 is facilitated. In particular, the pegboard bracket 10 may be easily rotated and manipulated into position for engaging the pegboard panel 3 without a support arm element interfering with shelving or other structures.

Figure 5:
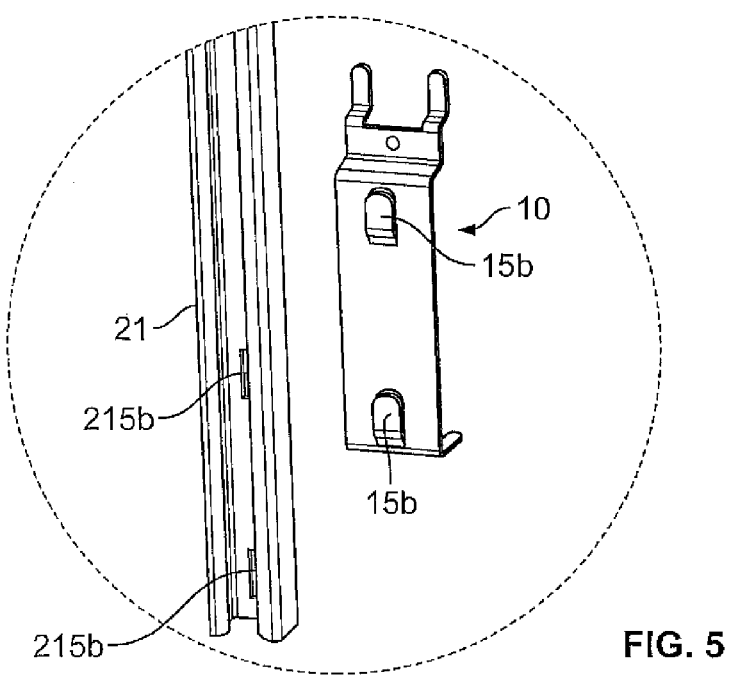
FIG. 5 shows a detail of connection elements for securing a support arm to a pegboard bracket according to an embodiment of the invention.

Pegboard bracket 10 also includes a plurality of first connection elements 15 disposed at front face 112 of backplate member 11 and configured to engage corresponding connection elements 215 disposed on a first elongated member 21 of support arm 20. First connection elements 15 may includes a plurality, for example a pair, of projections 15 projecting outwardly from the front face 112 of the backplate member 11. Projections 15 may be, for example, rivet bosses 15a of any suitable size, such as ⅜ inch head rivet bosses and second connection elements 215 may be openings of a corresponding size, such as for example, keyhole openings 215a as shown in FIG. 9. Projections 15 may also be, for example, lance tabs 15b and second connection elements 215 may be slots 215b of a corresponding size, as shown in FIG. 5.

Alternatively, the connection elements provided on pegboard bracket 10 could comprise openings and the connection elements provided on first elongated member 21 of support arm 20 could comprise associated projections.

Support arm 20 includes a first elongated member 21 extending in a first, generally vertical, direction. As set forth above, first elongated member 21 has a plurality of second connection elements 215, each of which is configured to engage an associated first connection element 15 of the plurality of first connection elements 15 for securing support arm 20 to pegboard bracket 10. As shown in FIGS. 5 and 9, respectively, second connection elements 215 may be slots 215b or keyhole openings 215a. In addition, a fastener, for example a screw, may be added to lock support arm 20 to pegboard bracket 10.

Support arm 20 further includes a second elongated member 22 extending in a second direction substantially perpendicular to the first direction. The second direction is generally horizontal. Second elongated member 22 may be coupled to first elongated member 21, for example by a tack weld joint or other suitable means, or alternatively may formed as integral unit by bending or other suitable processes.

First elongated member 21 and second elongated member 22 define a generally L-shaped element and may include any suitable dimensions and material. For example, support arm 20 may be formed from a 20.58 inch by 2.6 inch length of 18 gauge cold rolled steel.

Extension arm 30 slidably engages second elongated member 22 of support arm 20. In this way, header support system 1 is horizontally adjustable in that extension arm 30 is movable relative to support arm 20, thereby allowing for horizontal adjustment of the product display header, for example to accommodate shelves of varying depths. Extension arm 30 may be adjustable such that product display header 2 may be spaced a distance of approximately 13.5 inches to 21.5 inches from pegboard panel 3. Extension arm 30 may include any suitable dimensions and material. For example extension arm 30 may be formed from a 12.1 inch by 2.1 inch length of 18 gauge cold rolled steel.

Second elongated member 22 and extension arm 30 may be substantially tubular members, for example square or round tubular material which is closed or partially open, or any other suitable configuration. Moreover, second elongated member 22 and extension arm 30 may be configured and dimensioned such that extension arm 30 is received within second elongated member 22, as shown, or alternatively, such that second elongated member 22 is received within extension arm 30.

Front plate 40 is disposed at a proximate end 31 of extension arm 30 for receiving the product display header 2. Front plate 40 may be secured to proximate end 31 of extension arm 30 by any suitable means, such as for example by welding, or may be formed integrally therewith. Front plate 40 may include any suitable dimensions and material. For example, front plate 40 may measure approximately 3.125 inches high and 2.125 inches wide and be formed from 16 gauge cold rolled steel.

Figure 11:
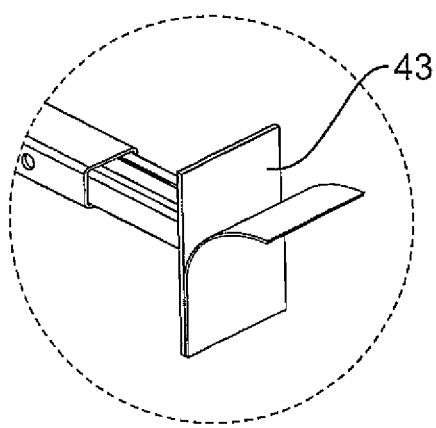
FIG. 11 shows a front plate disposed at a proximate end of an extension arm and having a fastening element according to an embodiment of the invention.

Front plate 40 may include a fastening element 43 disposed thereon for securing product display header 2 to front plate 40. Fastening element 43 may be an adhesive material, for example, a foam tape pad or any suitable adhesive material. Alternatively, an adhesive material could be provided on a portion of product display header 2 for securing to front plate 40. FIG. 11 shows the removal of a cover from fastening element 43 in the form of a foam tape pad in preparation for securing a product display header 2 to front plate 40. Fastening element 43 may alternatively be a hook and loop type fastening material, wherein a first portion of the hook and loop type fastening material is disposed on front plate 40 and a corresponding portion of hook and loop type fastening material is disposed on the product display header 2.

Header support system may further includes a spring detent 50 for locking extension arm 30 in a selected position. Spring detent 50 may include an outwardly biased spring element 51, for example a ¼ inch wide length of bent spring steel having a detent protrusion 52 as shown in FIG. 2. Outwardly biased spring element 51 may be disposed within extension arm 30 and detent protrusion 52 may protrude through a detent opening 33 provided at a distal end 32 of extension arm 30.

Second elongated member 22 may include a plurality of spaced apart adjustment openings 221 for receiving detent protrusion 52 and securing extension arm 30 at a selected depth. For example, second elongated member 22 of support arm 20 may include multiple openings 221 spaced at approximately one inch apart and dimensioned to receive detent protrusion 52.

Alternatively, the spring detent member 50 could be provided in the second elongated member 22 and extension arm 30 could be provided with a plurality of spaced apart openings for locking the components in a desired position.

Figure 6:
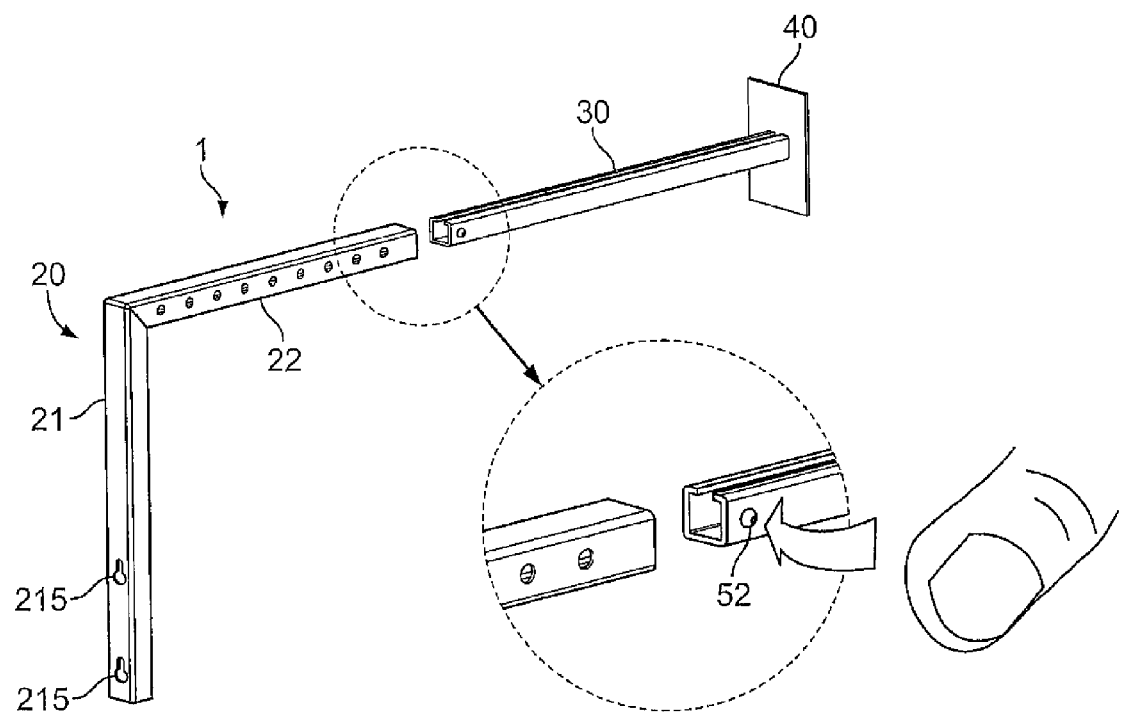
FIG. 6 shows a perspective view of a support arm and an extension arm according to an embodiment of the invention being assembled.
Figure 7:
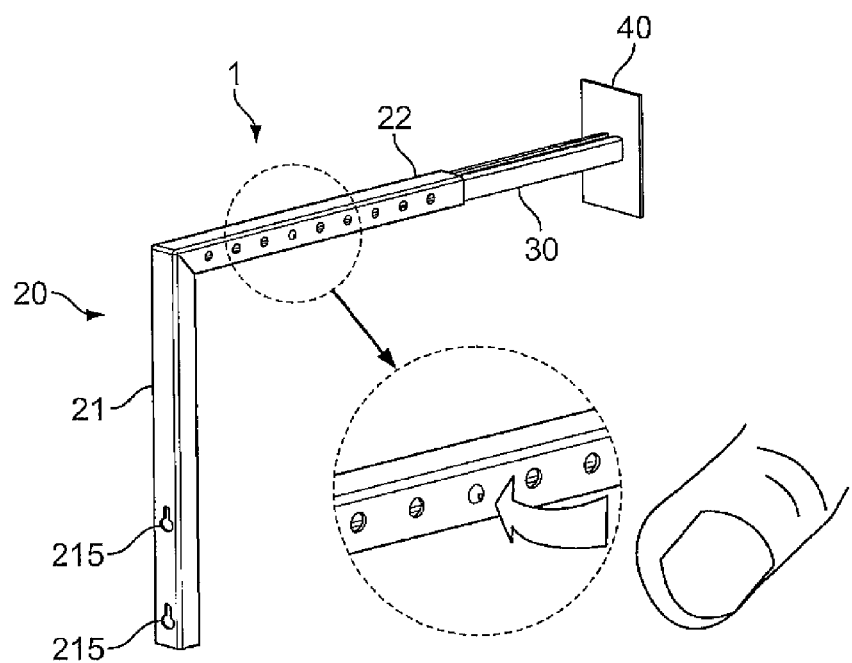
FIG. 7 shows a detail of a locking mechanism for locking the extension arm in a selected position.

As shown in FIGS. 6 and 7, during installation of the header support system 1, a person may push the detent protrusion 52 of spring detent 50 firmly and insert the extension arm 30 into the second elongated member 22 of the support arm 20. The user then repeatedly pushes the detent protrusion 52 of spring detent 50 and pushes in the extension arm 30 until the extension arm reaches the desired depth, at which point the detent protrusion 52 is locked into an associated adjustment opening 221 of the second elongated member 22 of support arm 20.

Figure 10:
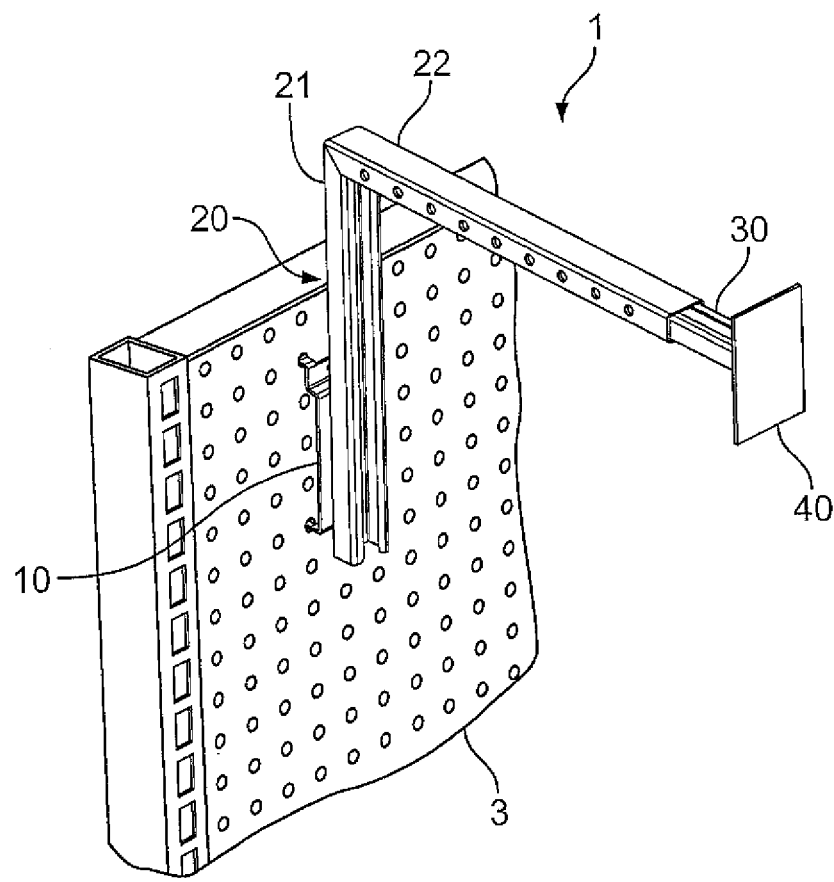
FIG. 10 shows an assembled header support system according to an embodiment of the invention secured to a pegboard panel and in position for receiving a product display header.

FIG. 9 shows a further step in installation of header support system 1, wherein connection elements, such as key holes 215a or slots 215b on a back surface of first elongated member 21 of support arm 20 are aligned with corresponding connection elements 15, such as rivet bosses 15a or lance tabs 15b, of pegboard bracket 10 and the support arm is pushed down to lock it in place. FIG. 10 shows one header support system 1 installed to a pegboard panel. A user may then repeat the process described above for installing a second header support system spaced apart from the first to provide a pair of units for supporting a product display header 2.

Although a number of embodiments of the present invention has been shown and described, it is to be understood that many changes and modifications may be made thereunto without departing from the spirit and scope of the invention as defined in the appended claims.

What is claimed is:

1. A header support system for supporting a product display header on a pegboard panel of a gondola, the pegboard panel extending in a plane and the gondola supporting a shelf having a depth extending in a horizontal direction perpendicular to the plane of the pegboard panel, the header support system comprising:
   a) a pegboard bracket comprising:
      i) a backplate member having an upper portion, a lower portion and a front face;
      ii) a spacer member, at least a portion of which extends rearwardly from said upper portion of said backplate member;
      iii) a plurality of spaced apart upper prongs disposed on said spacer member, said upper prongs configured for engaging the pegboard panel;
      iv) a plurality of spaced apart lower prongs disposed on said lower portion of said backplate member, said lower prongs configured for engaging the pegboard panel; and
      v) a plurality of first connection elements disposed at said front face of said backplate member;
   b) a support arm comprising:
      i) a first elongated member configured to extend in a vertical direction parallel to a plane of the pegboard panel, said first elongated member having a plurality of second connection elements, wherein each of said plurality of second connection elements is configured to engage an associated first connection element of said plurality of first connection elements for securing said support arm to said pegboard bracket; and
      ii) a second elongated member comprising a first substantially tubular member configured to extend in the horizontal direction;
   c) an extension arm comprising a second substantially tubular member slidably engaging said second elongated member of said support arm;
   d) a front plate disposed at a proximate end of said extension arm for receiving the product display header; and
   e) a spring detent comprising an outwardly biased spring element having a detent protrusion,
      wherein said extension arm is movable relative to said second elongated member in the horizontal direction to provide horizontal adjustment of the product display header and accommodate shelves of various depths.

2. The header support system according to claim 1, wherein said plurality of first connection elements comprises a plurality of projections projecting outwardly from said front face of said backplate member and said plurality of second connection elements comprises a plurality of openings.

3. The header support system according to claim 2, wherein said plurality of projections comprises a plurality of rivet bosses and said plurality of openings comprises a plurality of keyhole openings.

4. The header support system according to claim 2, wherein said plurality of projections comprises a plurality of lance tabs and said plurality of openings comprises a plurality of slots.

5. The header support system according to claim 1, wherein said front plate further comprises a fastening element disposed thereon.

6. The header support system according to claim 5, wherein said fastening element comprises a hook and loop type fastener.

7. The header support system according to claim 5, wherein said fastening element comprises an adhesive material.

8. The header support system according to claim 7, wherein said adhesive material comprises a foam tape pad.

9. The header support system according to claim 1, wherein said extension arm is received within said second elongated member.

10. The header support system according to claim 1 wherein said outwardly biased spring element is disposed within said extension arm and said detent protrusion protrudes through a detent opening provided at a distal end of said extension arm.

11. The header support system according to claim 10, wherein said second elongated member comprises a plurality of spaced apart adjustment openings for receiving said detent protrusion and securing said extension arm at a selected depth.

\* \* \* \* \*